(12) United States Patent
Roberts

(10) Patent No.: US 8,576,385 B2
(45) Date of Patent: Nov. 5, 2013

(54) PRESSURE SENSOR

(75) Inventor: Richard Damon Goodman Roberts, Southampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 467 days.

(21) Appl. No.: 12/443,901

(22) PCT Filed: Oct. 12, 2007

(86) PCT No.: PCT/GB2007/050630
§ 371 (c)(1),
(2), (4) Date: Oct. 5, 2010

(87) PCT Pub. No.: WO2008/044074
PCT Pub. Date: Apr. 17, 2008

(65) Prior Publication Data
US 2011/0096321 A1    Apr. 28, 2011

(30) Foreign Application Priority Data
Oct. 12, 2006 (GB) .................................. 0620339.2

(51) Int. Cl.
*G01B 11/16* (2006.01)
(52) U.S. Cl.
CPC .................................... *G01B 11/16* (2013.01)
USPC ........................................................ 356/32
(58) Field of Classification Search
CPC ....................................................... G01B 11/16
USPC ........................................................ 356/32–34
See application file for complete search history.

(56) References Cited

U.S. PATENT DOCUMENTS

| 6,191,414 | B1 | 2/2001 | Ogle et al. |
| 6,278,811 | B1 | 8/2001 | Hay et al. |
| 6,422,084 | B1 | 7/2002 | Fernald et al. |
| 7,277,162 | B2 * | 10/2007 | Williams .................. 356/32 |
| 7,315,666 | B2 | 1/2008 | Van Der |
| 2004/0129083 | A1 | 7/2004 | Fernald et al. |
| 2004/0206187 | A1 * | 10/2004 | Williams .................. 73/766 |

FOREIGN PATENT DOCUMENTS

GB        2186073        8/1987

* cited by examiner

*Primary Examiner* — Michael P Stafira
(74) *Attorney, Agent, or Firm* — Brandon S. Clark

(57) ABSTRACT

A pressure sensor (10) comprising fiber Bragg grating (FBG) strain sensors (12) provided within an optical fiber (14), an optical fiber strain sensor carrier rod 16 and a pressure intensifying sleeve (18). The carrier rod (16) is formed from a first glass fiber reinforced epoxy resin composite material having a first stiffness/elastic modulus the direction of strain sensing. The sleeve (18) is formed from a second composite material, having a lower axial stiffness in the direction of strain sensing than that of the carrier rod (16). Under an applied hydrostatic load, the sleeve (18) exerts an axial compressive load onto the section of rod (16) within the sleeve (18). The axial compressive strain experienced by the rod (16) is thereby increased in the region within the sleeve (18) compared to the axial compressive strain that would be produced in the rod (16) if the sleeve (18) was not present.

14 Claims, 4 Drawing Sheets

PRESSURE SENSOR

The invention relates to a pressure sensor.

It is desirable in many applications to be able to monitor the pressure of fluid within a pipeline. In the case of oil wells and oil transport pipelines, such as subsea risers and flowlines or land based pipelines, hydrates can form within the pipeline, causing fluid temperature and pressure to increase in the region of the pipeline behind the hydrates. Monitoring the pressure within a pipeline can allow hydrate formation and slugging to be identified.

Pressure sensors typically comprise an element that changes its shape and/or dimensions in response to a change in applied pressure and a strain sensor which detects a strain, or change in strain, within the said element and generates an output signal which is related to the applied pressure. Several pressure sensors have been proposed which use optical fiber gratings as the strain sensing element: U.S. Pat. No. 6,191,414 describes an optical fiber grating based pressure transducer in which the shape changing element comprises a composite elongate body having contra-helically wound reinforcing fibres to give the body a high Poisson's ratio; U.S. Pat. No. 6,278,811 describes a fiber optic Bragg grating pressure sensor having a pressure detecting device comprising a glass element whose elastic deformation is proportional to applied pressure; and U.S. 2004/0129083 describes an optical differential pressure sensor which comprises an optical fiber grating encased within and fused to a glass capilliary tube and/or a large diameter waveguide.

According to a first aspect of the invention there is provided a pressure sensor comprising: an optical fiber strain sensor; optical fiber strain sensor carrier means having a sensing region in which the optical fiber strain sensor is provided, the carrier means comprising a first material having a first stiffness in the direction of strain sensing; and pressure modifying means comprising a second material having a second stiffness in the direction of strain sensing, the pressure modifying means being mechanically coupled to the optical fiber strain sensor carrier means within the sensing region, such that when the pressure sensor is exposed to pressure, compression produced within the pressure modifying means acts on the optical fiber strain sensor carrier means, and thereby modifies the compression in the direction of strain sensing produced within the sensing region due to the applied pressure.

The strain produced in the direction of strain sensing within the sensing region of the optical fiber strain sensor carrier means is therefore different to the strain which would be produced within it if the pressure modifying means was not present. This difference in the resulting compression, detected by the optical fiber sensor, enables the pressure sensor to distinguish between compression due to applied pressure and compression due to axial load applied to the carrier means.

Preferably, the stiffness in the direction of strain sensing of the pressure modifying means is lower than the stiffness in the direction of strain sensing of the optical fiber sensor carrier means. The pressure modifying means thereby acts to increase the axial compression produced within the sensing region, and thus improves the sensitivity of the pressure sensor. The pressure modifying means preferably has a low Poisson's ratio. The Poisson's effect of the pressure modifying means acts against the compression induced in the pressure modifying means by applied pressure and a low Poisson's ratio will therefore maximise the sensitivity of the pressure sensor to applied pressure.

The optical fiber strain sensor carrier means preferably comprises an elongate rod. The pressure modifying means preferably comprises a sleeve provided around at least part of the circumference of the rod over the or each sensing region. The pressure modifying means preferably extends along the full length of the or each sensing region. The or each sleeve is preferably bonded onto the elongate rod.

The pressure modifying means may comprise a first orthotropic material, having a low elastic modulus along a first axis and a higher elastic modulus in the perpendicular axes. Preferably, the first orthotropic material has a low elastic modulus in the direction of strain sensing and a higher elastic modulus in the perpendicular plane. The first orthotropic material preferably comprises a fiber reinforced plastics material, and most preferably comprises a fiber reinforced epoxy matrix. The optical fiber sensor carrier means may comprise a second orthotropic material having a different elastic modulus in the direction of strain sensing to the first orthotropic material.

The cross-sectional area of the pressure modifying means is preferably greater than the cross-sectional area of the optical fiber sensor carrier means.

The optical fiber strain sensor may comprise a discrete optical fiber strain sensor.

The pressure sensor may comprise a plurality of discrete optical fiber strain sensors, each provided within a sensing region of the carrier means. The or each discrete optical fiber train sensor preferably comprises an optical fiber Bragg grating. The optical fiber strain sensor may alternatively comprise a distributed optical fiber strain sensor.

The or each optical fiber strain sensor may be embedded within the optical fiber sensor carrier means or may be provided on a surface of the optical fiber strain sensor carrier means.

The pressure sensor may further comprise a protective covering arranged to substantially transmit changes in fluid pressure to the pressure conversion means.

The protective covering may have holes provided therein to allow the transmission of changes in fluid pressure to the pressure conversion means. The pressure sensor may further comprise an optical fiber temperature sensor mechanically separate to the pressure modifying means for thermal compensation of the optical fiber strain sensor.

Embodiments of the invention will now be described in detail, by way of example only, with reference to the accompanying drawings, in which.

Figure 1:
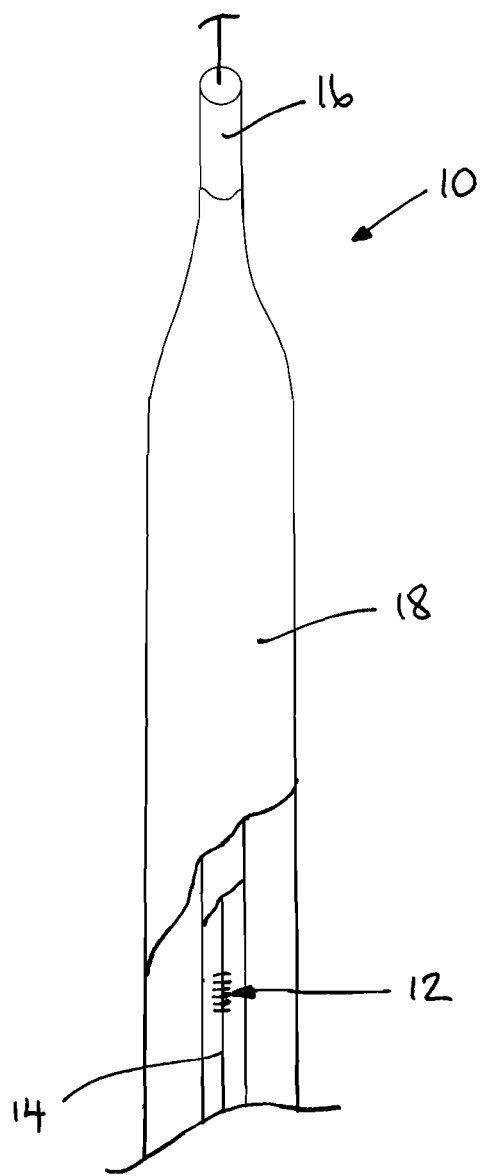
FIG. 1 is a part cut-away diagrammatic representation of one end of a pressure sensor according to a first embodiment of the invention.
Figure 2:
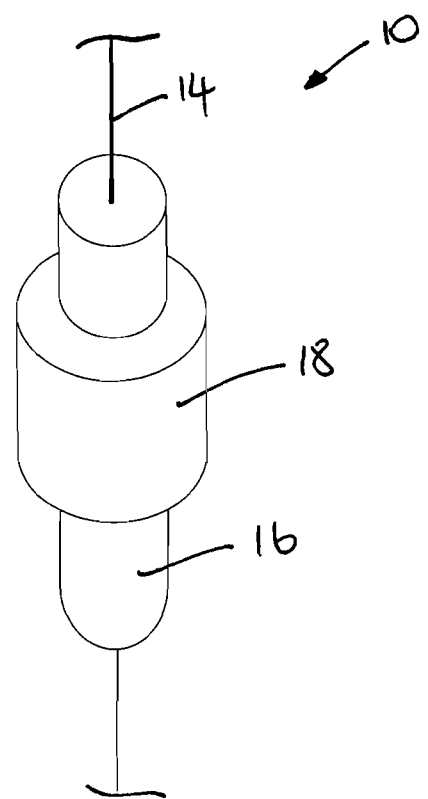
FIG. 2 is a diagrammatic representation of the elements of the pressure sensor of FIG. 1.

Referring to FIGS. 1 and 2, a pressure sensor 10 according to a first embodiment of the invention comprises an optical fiber strain sensor in the form of 80 fiber Bragg grating (FBG) strain sensors 12 provided within an optical fiber 14, an optical fiber strain sensor carrier rod 16 and pressure modifying means in the form of a pressure intensifying sleeve 18. Strain is used to mean strain or compression (negative strain), the FBG sensors 12 being sensitive to both strain and compression.

The carrier rod 16 is a 10 mm diameter rod having a length of approximately 4 km.

The carrier rod 16 is formed from a first glass fiber reinforced epoxy resin composite material. The composite material has an elastic modulus (E) of 20 GPa in the axial direction, which is the direction of strain sensing.

The pressure intensifying sleeve 18 is formed from a second composite material, having a lower axial stiffness (under bulk pressure loading) than that of the carrier rod 16. The composite material is an orthotropic glass fiber reinforced epoxy resin material having a low elastic modulus (E) (less than 1 GPa) in the axial direction, a higher elastic modulus (greater than 20 GPa) in the radial direction, and a radial sheer stiffness of less than 1 GPa The sleeve 18 has a thickness of 5 mm, and thus has a higher cross-sectional area than the carrier rod 16. The sleeve 18 is bonded to the carrier rod 16, and the radial sheer stiffness of the sleeve 18 ensures that good load transfer is obtained from the sleeve 18 to the rod 16. The sleeve 18 fully surrounds the rod 16 and extends for substantially the full length of the rod 16.

The FBG sensors 12 are equally distributed along the optical fiber 14, within respective sensing regions, and have a separation of 50 m. The optical fiber 14 and thus the axes of strain sensing of the FBG sensors 12 are arranged generally along the axis of the carrier rod 16. All of the FBGs 12 have the same central wavelength (1550 nm in this example) and are adapted for interrogation using a time division multiplexed (TDM) optical fiber interrogation system; such systems will be well know to the person skilled in the art and so will not be described in detail here. It will be appreciated that a wavelength division multiplexed (WDM) array of FBG sensors may alternatively be used, or a combined WDM/TDM array of FBG sensors may be used.

A second optical fiber (not shown) is provided alongside the strain sensor fiber 14 and is adapted to provide distributed temperature and strain measurements using Raman backscatter measurements.

Under an applied hydrostatic load, the sleeve 18 would experience significantly more axial strain than the rod 16 if they were not bonded together. By bonding the sleeve 18 to the rod 16, when pressure is applied to the pressure sensor 10, the sleeve 18 exerts an axial compressive load onto the section of rod 16 within the sleeve 18. The axial compressive strain experienced by the rod 16, under hydrostatic load, is thereby increased in the region within the sleeve 18 compared to the axial compressive strain that would be produced in the rod 16 if the sleeve 18 was not present. This difference in the resulting axial compressive strain within the rod 16 can be used to distinguish strain within the rod 16 due to pressure from strain within the rod 16 due to any axial load in the rod 16.

As will be appreciated by the skilled person, the sleeve 18 will also experience some lengthening due to Poisson's effect when it is exposed to external radial pressure. This effect acts contrary to the compressive effect of the bulk (isotropic) pressure being applied to the pressure sensor 10 and reduces the intensifying effect of the sleeve 18. The effect of the sleeve 18 on the rod 16 can thereby be maximised by minimising the Poisson's ratio of the sleeve 18.

The strain within the rod 16 acts on the FBG sensors 12 and the resulting wavelength changes in the FBGs 12 can be detected and converted into the corresponding strain change on the fiber 14, which in turn can be converted into a corresponding pressure. A 1000 pm wavelength change corresponds to a strain of 833µε, which in turn corresponds to 166 bar pressure. In this example, the pressure intensifying sleeve 18 converts each 1 bar of applied pressure into 5 microstrain of axial strain within the FBG sensors 12.

Figure 3:
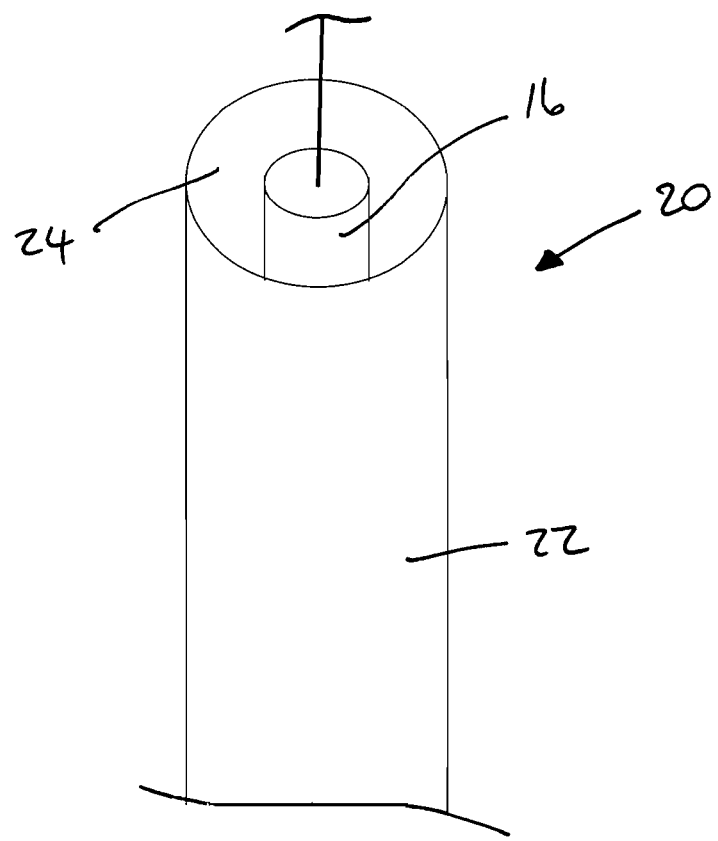
FIG. 3 is a diagrammatic representation of one end of a pressure sensor according to a second embodiment of the invention.

A pressure sensor 20 according to a second embodiment is shown in FIG. 3. The pressure sensor 20 of this embodiment is substantially the same as the pressure sensor 10 of the first embodiment, with the following modifications. The same reference numbers are retained for corresponding features.

In this embodiment, the pressure sensor 20 additionally comprises a protective covering in the form of a flexible tube 22, located around the rod 16. The tube 22 is spaced from the rod 16 and the gap defined therebetween is filled with oil 24. Changes in fluid pressure within a production fluid are transmitted across the tube 22 and the oil 24 to the pressure conversion means 16.

The tube 22 serves to protect the rod 16 from abrasion from pipeline walls or contaminants, such as sand, within a production fluid.

Figure 4:
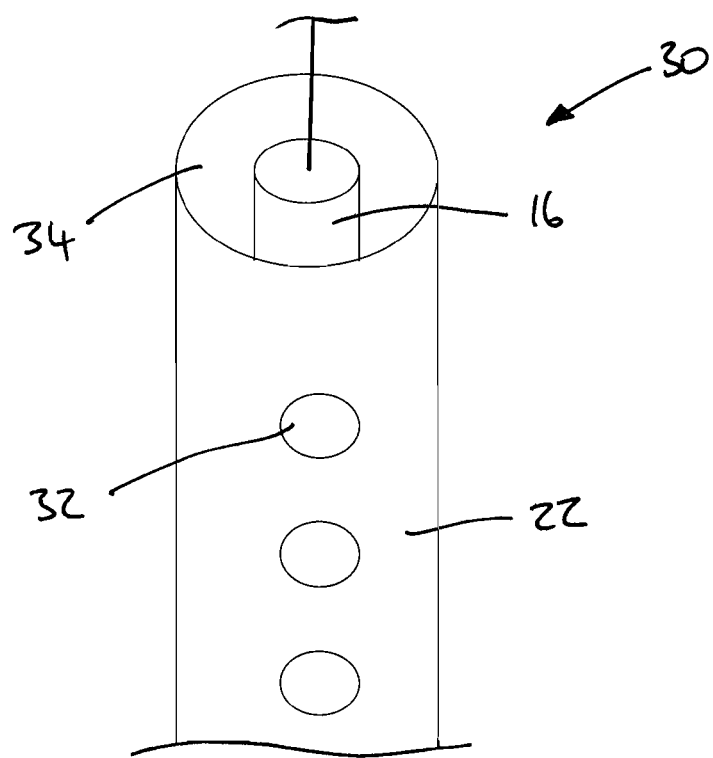
FIG. 4 is a diagrammatic representation of one end of a pressure sensor according to a third embodiment of the invention.

A pressure sensor 30 according to a third embodiment is shown in FIG. 4. The pressure sensor 30 of this embodiment is substantially the same as the pressure sensor 20 of the second embodiment, with the following modifications. The same reference numbers are retained for corresponding features.

In this embodiment, the protective tube 22 has a series of holes 32 provided therein and the oil 24 of the previous embodiment is replaced by production fluid, which is able to flow through the holes 32 into the gap 34 between the tube 22 and the rod 16.

Various modifications may be made to the described embodiments without departing from the scope of the invention. For example, the rod and the sleeve can each be constructed from an isotropic or an orthotropic material (including one being isotropic with the other being orthotropic), and when orthotropic materials are used advantage can be taken of using different properties in different directions for the orthotropic materials in order to optimize the output of the pressure sensor. It will be appreciated that in order to maximise the effect of the sleeve on the rod, and thus maximize the sensitivity of the pressure sensor, the difference between the stiffness (elastic modulus) in the direction of strain sensing of the rod and the sleeve should be as large as possible, but that the difference between the values will at least in part depend upon the required sensitivity of the pressure sensor and thus on its intended application.

A different type of orthotropic material may be used to that described, for example a different type of plastic may be used, such as a vinyl ester or a polyester, and a different type of reinforcing fiber which is stiffer, and possibly also stronger, than the plastic may be used, such as plastic fibres, carbon fibres, or metal fibres. It will also be appreciated that the density and alignment of the reinforcing fibres can be varied to change the properties of the orthotropic material.

The rod may be of a different cross-sectional shape and size, and length, to that described. The sleeve may be of a different thickness, so that the ratio of the cross-sectional areas of the rod and the sleeve are different to that described; the cross-sectional area of the sleeve may be greater, smaller or equal to the cross sectional area of the rod—increasing the cross sectional area of the sleeve with respect to the cross sectional area of the rod will increase the additional axial compressive strain applied to the rod by the sleeve, thereby increasing the sensitivity of the pressure sensor. The axial stiffness of the rod and the sleeve may be different to than that described. The axial stiffness of the sleeve relative to that of the rod may be lower in order to increase the axial compression applied to the rod by the sleeve, or may be higher if it is desirable to attenuate the response of the rod to applied pressure.

The array of discrete FBG sensors may be replaced by a distributed optical fiber sensor, such as an optical fiber which may be interrogated using Raman, Brillouin or Rayleigh scattering. The sleeve may be applied around the rod just within each sensing region, so that a series of separate sleeves are provided around the rod, one at each sensing region.

The invention claimed is:

1. A pressure sensor comprising:
   an optical fiber strain sensor;
   an optical fiber strain sensor carrier means having a sensing region in which the optical fiber strain sensor is provided, the carrier means comprising a first material having a first stiffness in the direction of strain sensing; and
   pressure modifying means comprising a second material having a second stiffness in the direction of strain sensing, the pressure modifying means being mechanically coupled to the optical fiber strain sensor carrier means within the sensing region, such that when the pressure sensor is exposed to pressure, compression produced within the pressure modifying means acts on the optical fiber strain sensor carrier means, and thereby modifies the compression in the direction of strain sensing produced within the sensing region due to the applied pressure
   wherein the pressure modifying means comprises a first orthotropic material, having a low elastic modulus in the direction of strain and a higher elastic modulus in the perpendicular plane to the direction of strain.

2. A pressure sensor as claimed in claim 1, wherein the stiffness in the direction of strain sensing of the pressure modifying means is lower than the stiffness in the direction of strain sensing of the optical fiber sensor carrier means.

3. A pressure sensor as claimed in claim 1 or 2, wherein the optical fiber strain sensor carrier means comprises an elongate rod.

4. A pressure sensor as claimed in claim 3, wherein the pressure modifying means comprises a sleeve provided around at least part of the circumference of the rod over the or each sensing region.

5. A pressure sensor as claimed in claim 1, wherein the first orthotropic material comprises a fiber reinforced plastics material.

6. A pressure sensor as claimed in claim 1, wherein the optical fiber sensor carrier means comprises a second orthotropic material having a different elastic modulus in the direction of strain sensing to the first orthotropic material.

7. A pressure sensor as claimed in claim 1, wherein the cross-sectional area of the pressure modifying means is greater than the cross-sectional area of the optical fiber sensor carrier means.

8. A pressure sensor as claimed in claim 1, wherein the optical fiber strain sensor comprises a discrete optical fiber strain sensor.

9. A pressure sensor as claimed in claim 8, wherein the pressure sensor comprises a plurality of discrete optical fiber strain sensors, each provided within a sensing region of the carrier means.

10. A pressure sensor as claimed in claim 8 or 9, wherein the or each discrete optical fiber strain sensor comprises an optical fiber Bragg grating.

11. A pressure sensor as claimed in claim 1, wherein the optical fiber strain sensor comprises a distributed optical fiber strain sensor.

12. A pressure sensor as claimed in claim 1, wherein the pressure sensor further comprises a protective covering arranged to substantially transmit changes in fluid pressure to the pressure modifying means.

13. A pressure sensor as claimed in claim 12, wherein the protective covering has holes provided therein to allow the transmission of changes in fluid pressure to the pressure modifying means.

14. A pressure sensor comprising:
   an optical fiber strain sensor;
   an optical fiber strain sensor carrier means having a sensing region in which the optical fiber strain sensor is provided, the carrier means comprising a first material having a first stiffness in the direction of strain sensing; and
   pressure modifying means comprising a second material having a second stiffness in the direction of strain sensing, the pressure modifying means being mechanically coupled to the optical fiber strain sensor carrier means within the sensing region, such that when the pressure sensor is exposed to pressure, strain produced within the pressure modifying means acts on the optical fiber strain sensor carrier means, and thereby modifies the strain in the direction of strain sensing produced within the sensing region due to the applied pressure,
   wherein the pressure sensor further comprises a protective covering having holes provided therein to allow the transmission of changes in pressure to the pressure modifying means.

* * * * *